United States Patent [19]
Griffin

[11] 3,851,432
[45] Dec. 3, 1974

[54] MOTOR VEHICLE WINDOW MOLDING

[75] Inventor: Henry W. Griffin, Birmingham, Mich.

[73] Assignee: General Motors Corporation, Detroit, Mich.

[22] Filed: May 10, 1973

[21] Appl. No.: 359,131

[52] U.S. Cl.................... 52/400, 52/403, 52/468, 52/417
[51] Int. Cl............................ E06b 3/30, E06b 3/62
[58] Field of Search............ 52/400, 379, 403, 716, 52/717, 417, 468, 401

[56] References Cited
UNITED STATES PATENTS

| | | | |
|---|---|---|---|
| 1,480,383 | 1/1924 | Figge | 52/62 |
| 2,823,951 | 2/1958 | Stahl | 52/717 |
| 2,848,887 | 8/1958 | Compton | 52/417 |
| 3,241,281 | 3/1966 | Hall | 52/400 |
| 3,274,740 | 9/1966 | Hall | 52/400 |
| 3,292,330 | 12/1966 | Trennison | 52/417 |

FOREIGN PATENTS OR APPLICATIONS

| | | | |
|---|---|---|---|
| 1,279,492 | 3/1968 | Germany | 52/400 |
| 1,801,148 | 4/1970 | Germany | 52/400 |
| 2,026,098 | 12/1970 | Germany | 52/400 |

Primary Examiner—Frank L. Abbott
Assistant Examiner—Henry Raduazo
Attorney, Agent, or Firm—H. Furman

[57] ABSTRACT

A molding for concealing the juncture between a flanged window opening defined by flanges of body members and a window glass adhesively secured to the flanges defining the body opening. The molding is a plastic extrusion having a decorative trim portion which bridges the space between the edge of the window glass and the flange and also a pair of continuous legs which extend into the adhesive. The leg nearest the body flange has a flange which resiliently engages the body flange to bias the molding toward the window glass. This flange of the molding leg is cut away at repeated intervals along its length to permit the adhesive to flow through and behind the flange. The other leg of the molding has a bent flange for engaging the underside of the window glass to thereby hold the molding flush against the window glass. The molding assists in maintaining the relative position between the window glass and the body panel until the adhesive is cured.

1 Claim, 3 Drawing Figures

PATENTED DEC 3 1974　　　　　　　　　　3,851,432

MOTOR VEHICLE WINDOW MOLDING

The invention relates to a window molding for a motor vehicle body and more particularly to a molding for concealing the juncture between a fixed window glass and vehicle body panels.

It is known to mount window glass in a flanged vehicle body opening by use of a bonding strip of curable adhesive.

It is also known to conceal the juncture between the window glass and the vehicle body by use of a molding which bridges the space between the body panel and the window glass. Such moldings are conventionally attached by a plurality of clips spaced along the length of the molding.

It is also known to attach the molding by the same adhesive which binds the window glass to the body panel. For example, an adhesive bonding strip of uncured butyl rubber and rectangular in cross-section may be employed to attach both the window glass and the molding to the vehicle body. The bonding strip is prefabricated in its rectangular cross-section with one side face thereof covered with a fabric overlay. The fabric overlay prevents undesirable flow of the uncured butyl rubber onto the vision area of the window glass. The bonding strip is deformed during the pressing of the window glass thereagainst and the butyl rubber is caused to flow and substantially fill the recess or space which would exist between the edge of the window glass and the body panel. A flat strip of decorative molding is located over this recess and becomes adhesively secured to the butyl rubber which has filled the recess. It will thus become apparent that the molding strip must be used in combination with a bonding strip, window glass, and body panels which are so predictable in assembled dimensions that the bonding strip will consistently fill the recess between the window glass and body panel and thereby present a continuous surface for adhesive contact against the flat molding strip.

It is the object of this invention to provide a molding strip which will be adhesively secured to the window glass bonding strip irrespective of the variations in quantity of the curable adhesive and dimensional variation between the window glass and the flanged body opening.

A further object of the invention is the provision of a molding which assists in holding and positioning the window glass relative the vehicle body opening until such time as the adhesive is cured.

The molding of this invention is used in combination with a vehicle body window opening defined by an inwardly offset flange on the various body panels including the roof panel, roof pillars and cowl. A bead of curable adhesive material is applied continuously around the edge of the window glass or alternatively around the flange defining the window opening. The window glass is then centrally located in the window opening.

The molding of the invention is a plastic extrusion having a decorative trim portion which bridges the space between the edge of the window glass and the body panel. The molding also has a pair of continuous legs which are inserted into the curable adhesive in the space between the edge of the window glass and the body panel. The leg nearest the body panel has a flange which resiliently engages the flange of the body panel to urge the molding toward the window glass. This flange of the molding leg is cut away at repeated intervals along its entire length to permit it to pass through the adhesive upon insertion thereinto and to allow the adhesive to flow in behind the flange. The other leg of the molding includes a flange which is resiliently engaged under the underside edge portion of the window glass and thereby holds the decorative trim portion of the molding flush against the window glass. Thus it is seen that the molding assists in maintaining the relative position between the window glass and the body panel until the adhesive is cured. Furthermore, once the adhesive is cured the bent legs of the molding are secured in the adhesive to prevent removal of the molding from its installed position.

Referring to the drawings, FIG. 1 is a partial front perspective view of the vehicle body having a fixed window glass mounted thereon in accordance with the invention;

Figure 1:
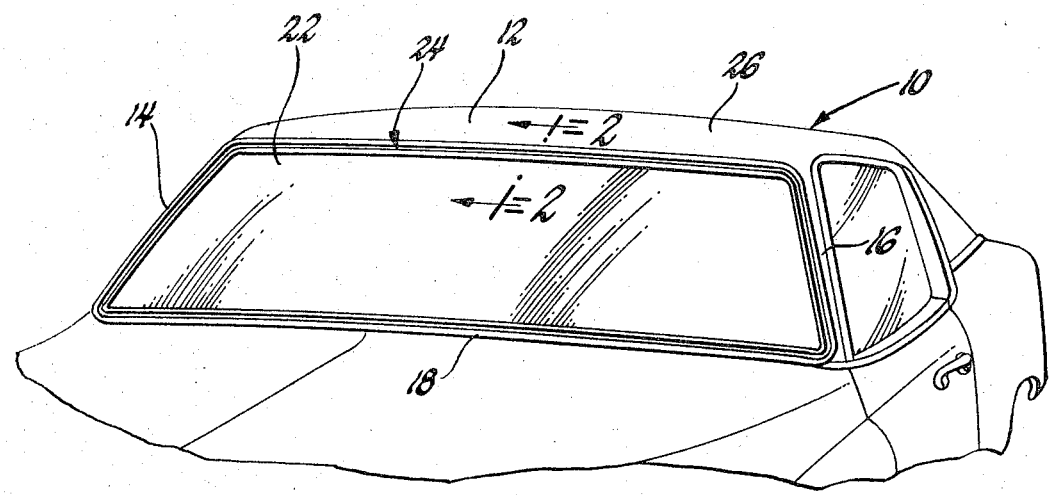

Referring now to the drawings, vehicle body 10 includes a conventional roof structure 12, roof pillars 14 and 16, and a cowl 18 which define a conventional flanged window opening 20 closed by a fixed window glass or windshield 22. A molding 24 conceals the juncture between the window glass and the various body members defining the flanged window opening 20.

Figure 2:
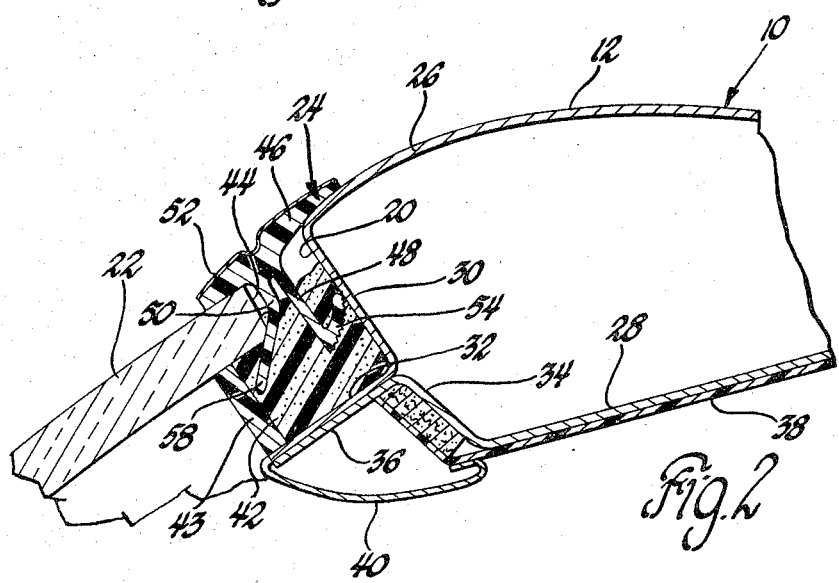
FIG. 2 is a cross-sectional view taken in the direction of arrows 2—2 of FIG. 1.

Referring to FIG. 2 it will be seen that the roof structure 12 includes an outer panel 26 and an inner panel 28. Outer panel 26 includes an inwardly offset flange 30 extending generally normal to the window glass 22 and a wall 32 extending generally forwardly and parallel to the window glass 22. The roof inner panel 28 has a similar flange 34 and wall 36. Wall 36 abuts and is pinch-welded to the wall 32 of the roof outer panel 26. A fabric headlining 38 is mounted to the roof inner panel 28 and a garnish molding 40 conceals the attachment of the headlining 38 to the roof inner panel. The roof pillars 14 and 16, and the cowl 18 each have conventional inwardly offset flanges similar to those of the roof structure 12 and cooperating therewith to provide the flanged body opening 20. The window glass 22 is mounted in the flanged window opening 20 by a bead 42 of curable adhesive material which is applied along the perimeter of the window glass or in the alternative continuously around the flange of opening 20. A rubber dam 43 is applied to the wall 32 of roof outer panel 26 prior to application of the bead 42 to confine the curable adhesive as well as assist in positioning of the glass.

The curable adhesive material is a polysulfide base material having suitable fillers and solvents added thereto. When cured, the material exhibits the properties of rubber in that it is capable of accepting shear stress, will not crack or corrode in various climates, and will wet both glass and painted metal to insure a continuous bond between the body flange and the window glass. When the window glass 22 is located centrally in the flanged window opening 20, space remains between the edge portion 44 of the window glass and the flange 30 and similar flanges of the other body members. The bead 42 of curable adhesive flows into this space to a varying degree as determined by the quantity and shape of the bead, the dimensional variations between the glass and the flanges, and the degree to which the glass is pushed into the opening.

Figure 3:
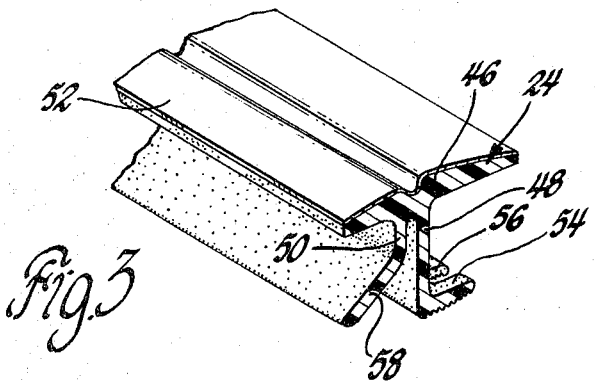
FIG. 3 is a perspective sectional view of the molding according to the invention.

Referring to FIG. 3, the molding 24 is a plastic extrusion having a decorative trim portion 46 and integral resilient legs 48 and 50. The decorative trim portion 46 is of sufficient width to bridge the space between the window glass 22 and the flange 30 and similar flanges of the other body members and to extend a short distance onto both the window glass 22 and the other body members. The decorative trim portion 46 may have a metallized mylar coating 52 to provide a chrome visual effect. The flanges 48 and 50 are thrust into the bead 42 of curable adhesive prior to curing of the adhesive and preferably immediately following installation of the window glass 22. The resilient leg 48 has a flange portion 54 extending laterally thereof and engaging flange 30 so as to be bent into a reverse bent position as shown in FIG. 2 when inserted into the bead 42 of adhesive. The flange 54 of leg 48 is cut away at 56 at spaced intervals or has spaced pierced opening along its length to permit the bead 42 of the curable adhesive to flow in behind the flange. The resilient leg 50 of molding 24 includes a forwardly bent flange 58 which is engaged against the underside edge or corner of the window glass 22, as seen in FIG. 2. The flange 54 of leg 48 biases the molding 24 bodily toward the glass 22 causing the glass to be tightly engaged between the decorative trim portion 46 and the forwardly bent flange 58 so that no gap exists between the glass and the decorative trim portion. Furthermore, when the molding 24 is inserted in the bead 42, the decorative trim portion engaging outer panel 26 or the similar body panel is flexed from its normal position of FIG. 3 so as to be self-biased against the panel to prevent gaps. The resilient flanges 54 and 58 of legs 48 and 50 of the extruded plastic molding 24 assist in locating and holding the window glass 22 centrally of the window opening 22 until such time as the bead 42 of curable adhesive is cured.

When the bead of curable adhesive is cured, the window glass 22 and molding 24 are attached by adhesion to the flange 30 and the similar flanges of the other body members defining the flanged window opening 20. The molding 24 is preferably coated with an appropriate primer which promotes adhesion between the molding and the bead of curable adhesive.

Thus it is seen that an improved window molding is provided which is adhesively secured to the vehicle body irrespective of variations in the dimensions of the adhesive bead, the body panels, and the window glass. The molding also assists in locating and holding the window glass in position until the adhesive is cured.

What is claimed is:

1. In a motor vehicle body having a window opening defined by flanged body panels, a window glass for closing the window opening and when mounted therein having a space between the edge of the window glass and a flange of the body panel, and a bead of curable adhesive mounting the window glass to the flanged body panels, a molding for concealing the space between the edge of the window glass and said flange of the body panel and comprising: a decorative trim portion bridging the space between the window glass and the body panel and extending a distance thereon, first and second legs extending continuously along the length of the molding and extending generally perpendicularly from the decorative trim portion respectively adjacent said flange of the body panel and the edge of the window glass, said first leg having a flange portion extending laterally thereof and biased to a reversely bent position engaging said flange of the body panel during insertion of the first leg into the bead of curable adhesive, the engagement of the reversely bent flange portion of the first leg with said flange of the body panel resiliently biasing the molding toward the edge of the window glass, a plurality of openings at spaced intervals in the first leg to allow flow of the curable adhesive behind the reversely bent flange portion of the first leg to provide complete embedment of the first leg in the bead of curable adhesive, said second leg having a forwardly bent flange portion for insertion into the bead of curable adhesive, the resilient biasing action of the first leg causing the edge of the window glass to be wedgingly engaged between the decorative trim portion and the forwardly bent flange portion whereby the window glass is positioned by the molding centrally of the window opening and the decorative trim portion is engaged against the window glass.

* * * * *